US012778209B2

(12) United States Patent
Lee

(10) Patent No.: US 12,778,209 B2
(45) Date of Patent: Nov. 3, 2026

(54) AEROSOL GENERATING DEVICE FOR CONTROLLING POWER SUPPLY TO HEATER AND OPERATING METHOD THEREOF

(71) Applicant: KT&G CORPORATION, Daejeon (KR)

(72) Inventor: Jae Min Lee, Siheung-si (KR)

(73) Assignee: KT&G CORPORATION, Daejeon (KR)

( * ) Notice: Subject to any disclaimer, the term of this patent is extended or adjusted under 35 U.S.C. 154(b) by 956 days.

(21) Appl. No.: 17/913,039

(22) PCT Filed: Aug. 5, 2022

(86) PCT No.: PCT/KR2022/011690
§ 371 (c)(1),
(2) Date: Mar. 9, 2023

(87) PCT Pub. No.: WO2023/033388
PCT Pub. Date: Mar. 9, 2023

(65) Prior Publication Data
US 2024/0215653 A1 Jul. 4, 2024

(30) Foreign Application Priority Data
Sep. 2, 2021 (KR) ........................ 10-2021-0117105

(51) Int. Cl.
*A24F 40/57* (2020.01)
*A24F 40/51* (2020.01)
(Continued)

(52) U.S. Cl.
CPC .............. *A24F 40/57* (2020.01); *A24F 40/51* (2020.01); *A24F 40/53* (2020.01); *A24F 40/60* (2020.01);
(Continued)

(58) Field of Classification Search
CPC ................................. A24F 40/57; A24F 40/85
See application file for complete search history.

(56) References Cited

U.S. PATENT DOCUMENTS 9,072,321 B2 * 7/2015 Liu ..................... G01P 13/0026
9,285,405 B2 * 3/2016 Cheng ................... G06F 1/1692
(Continued)

FOREIGN PATENT DOCUMENTS

CN 109998171 A 7/2019
EP 3 711 534 A1 9/2020
(Continued)

OTHER PUBLICATIONS

PalmSens, https://web.archive.org/web/20210612224611/https://www.palmsens.com/product/micrux-ed-ide-interdigitated-electrodes/ (Year: 2021).*
(Continued)

*Primary Examiner* — Russell E Sparks
(74) *Attorney, Agent, or Firm* — Sughrue Mion, PLLC

(57) ABSTRACT

An aerosol generating device may include a heater configured to heat an aerosol generating article, a sensor configured to generate a sensing signal corresponding to a change in capacitance of an accommodation space into which the aerosol generating article is inserted, and a processor electrically connected to the heater and the sensor, wherein the processor may be further configured to detect whether the sensing signal obtained from the sensor falls within a preset range, and supply first power to the heater based on the sensing signal being within the preset range.

12 Claims, 7 Drawing Sheets

(51) Int. Cl.

| | |
|---|---|
| ***A24F 40/53*** | (2020.01) |
| ***A24F 40/60*** | (2020.01) |
| ***A24F 40/85*** | (2020.01) |
| ***G01D 5/24*** | (2006.01) |
| ***H05B 1/02*** | (2006.01) |

(52) U.S. Cl.

CPC ............... *A24F 40/85* (2020.01); *G01D 5/24* (2013.01); *H05B 1/0252* (2013.01)

(56) References Cited

U.S. PATENT DOCUMENTS

| | | | | |
|---|---|---|---|---|
| 9,980,519 | B2 * | 5/2018 | Xiang | H05B 1/0244 |
| 10,028,535 | B2 * | 7/2018 | Mironov | H05B 1/0244 |
| 10,051,891 | B2 * | 8/2018 | Sur | A24F 40/60 |
| 10,410,036 | B2 * | 9/2019 | He | G06F 3/044 |
| 10,548,350 | B2 | 2/2020 | Greim | |
| 10,687,553 | B2 * | 6/2020 | Kaufman | A24F 40/50 |
| 10,939,704 | B2 * | 3/2021 | Reevell | A24F 40/40 |
| 11,914,141 | B1 * | 2/2024 | Rothkopf | G06V 40/18 |
| 11,927,574 | B2 * | 3/2024 | Gianchandani | G01N 30/461 |
| 12,302,947 | B2 * | 5/2025 | Qiu | A24F 40/46 |
| 12,349,738 | B2 * | 7/2025 | Achtien | A24F 40/65 |
| 2018/0206553 | A1 | 7/2018 | Reevell | |
| 2019/0261683 | A1 | 8/2019 | Reevell | |
| 2020/0237005 | A1 | 7/2020 | Lim et al. | |
| 2020/0352224 | A1 | 11/2020 | Plojoux et al. | |
| 2020/0359699 | A1 | 11/2020 | Lee et al. | |
| 2021/0015162 | A1 | 1/2021 | Moloney et al. | |
| 2021/0052835 | A1 | 2/2021 | Lee | |
| 2021/0251295 | A1 | 8/2021 | Mironov et al. | |
| 2022/0125110 | A1 * | 4/2022 | Frake | A24D 1/20 |
| 2022/0160051 | A1 * | 5/2022 | Frake | A24F 40/53 |
| 2022/0264702 | A1 | 8/2022 | Sago et al. | |
| 2024/0041110 | A1 * | 2/2024 | Batista | A24F 40/46 |

FOREIGN PATENT DOCUMENTS

| | | | |
|---|---|---|---|
| JP | 2005-64359 | A | 3/2005 |
| JP | 2020-527944 | A | 9/2020 |
| JP | 2020-535829 | A | 12/2020 |
| JP | 2021-507715 | A | 2/2021 |
| JP | 2021-81117 | A | 5/2021 |
| KR | 10-2017-0134773 | A | 12/2017 |
| KR | 10-2020-0005079 | A | 1/2020 |
| KR | 10-2133766 | B1 | 7/2020 |
| WO | 2017/051006 | A1 | 3/2017 |
| WO | 2020/165450 | A1 | 8/2020 |
| WO | 2020/193240 | A1 | 10/2020 |
| WO | 2021/141290 | A1 | 7/2021 |
| WO | 2021/157841 | A1 | 8/2021 |

OTHER PUBLICATIONS

Communication dated Aug. 8, 2024 in European Application No. 22 768 248.1.

International Search Report and Written Opinion of the International Searching Authority dated Nov. 18, 2022 in Application No. PCT/KR2022/011690.

Korean Office action dated Jan. 2, 2024 in Application No. 10-2021-0117105.

Extended European Search Report dated Oct. 30, 2023 in Application No. 22768248.1.

Office Action issued Dec. 3, 2024 in Korean Patent Application No. 10-2024-0121148.

Communication dated Jan. 22, 2026 issued by the State Intellectual Property Office of the P.R. China in application No. 202280006208.7.

* cited by examiner

[Fig. 1]
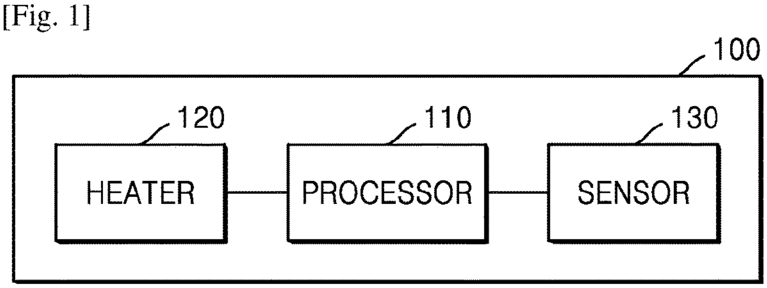
[Fig. 2]
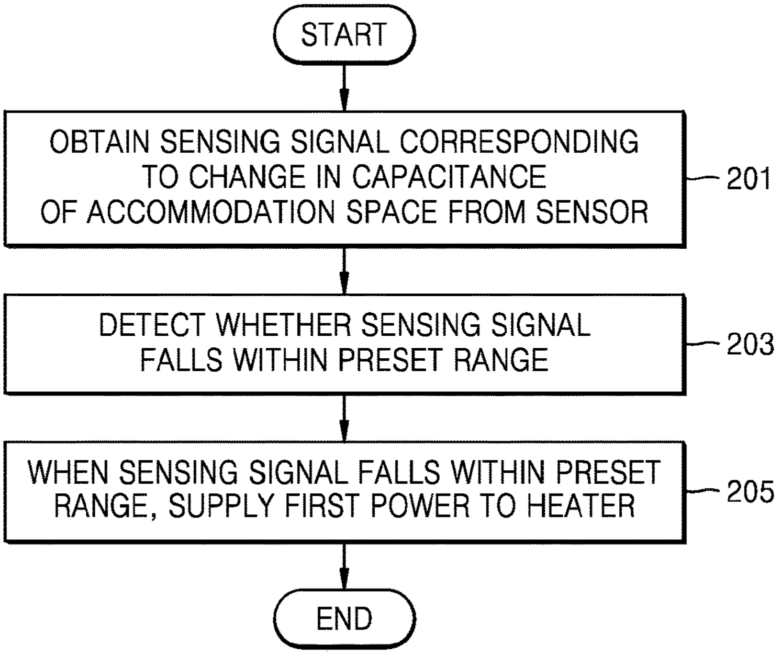
[Fig. 3A]
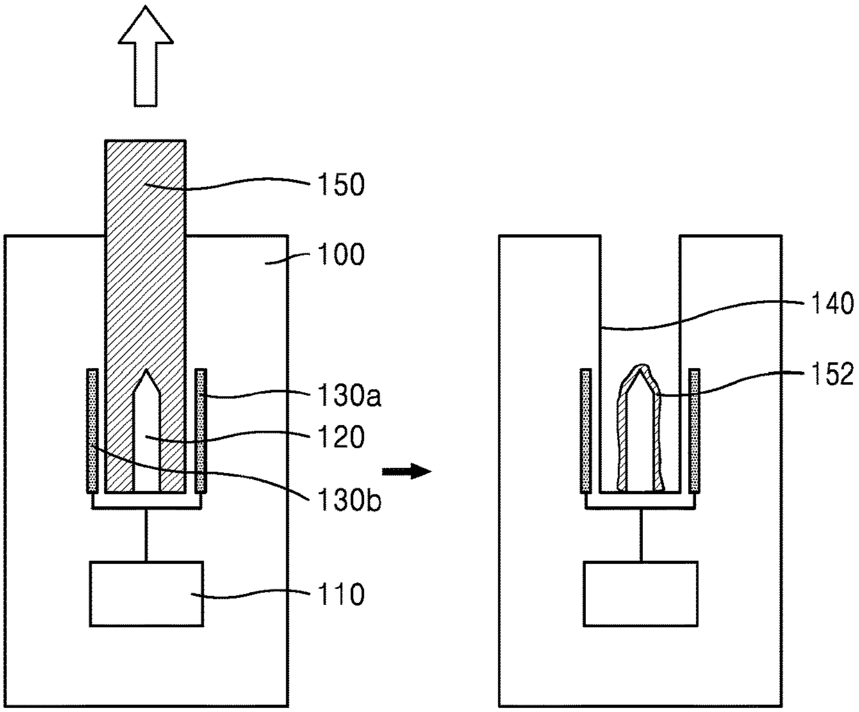

[Fig. 3B]
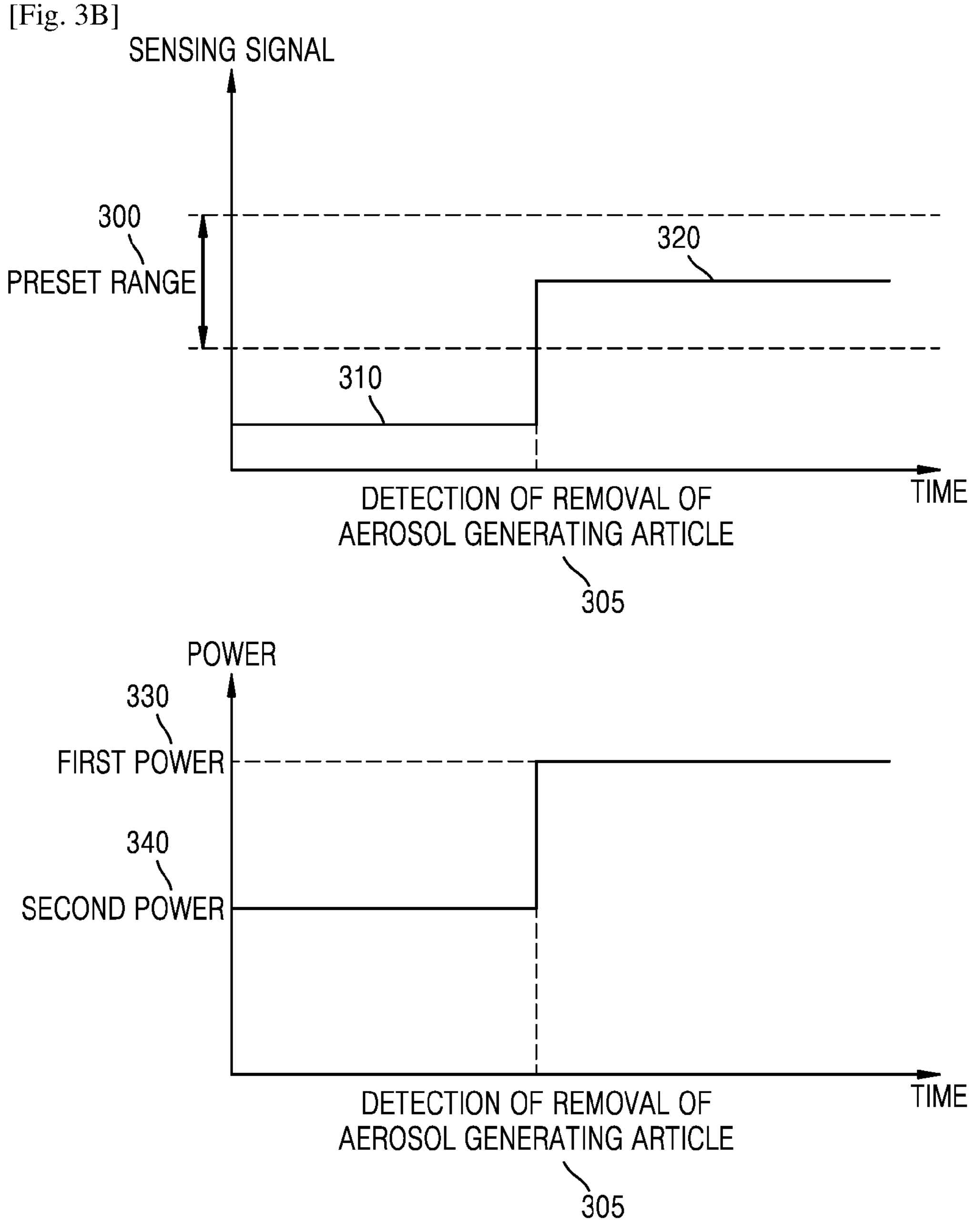

[Fig. 4A]
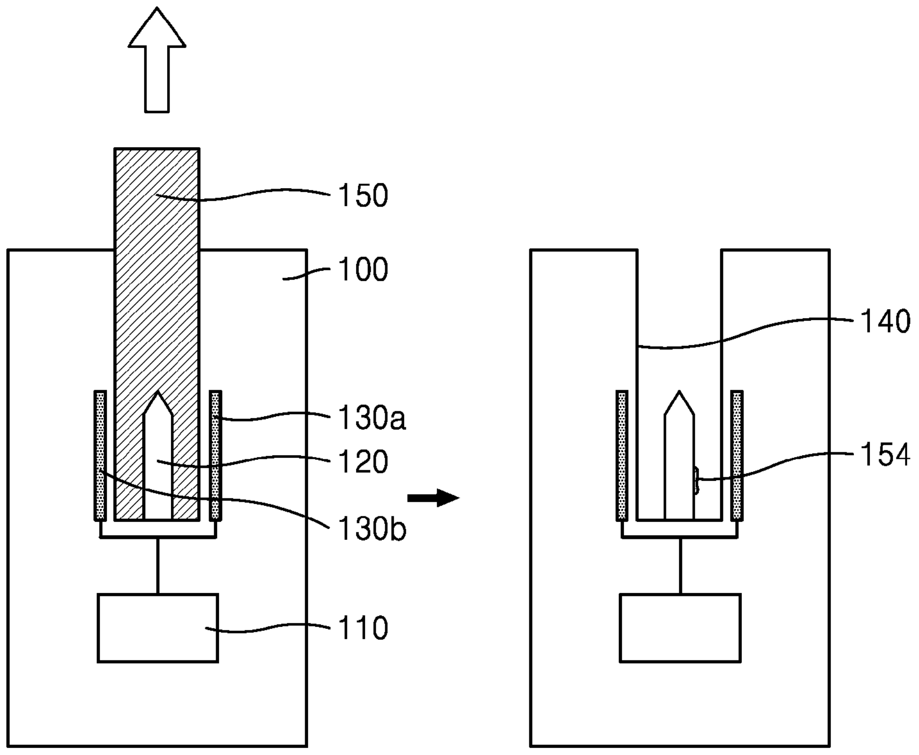

[Fig. 4B]
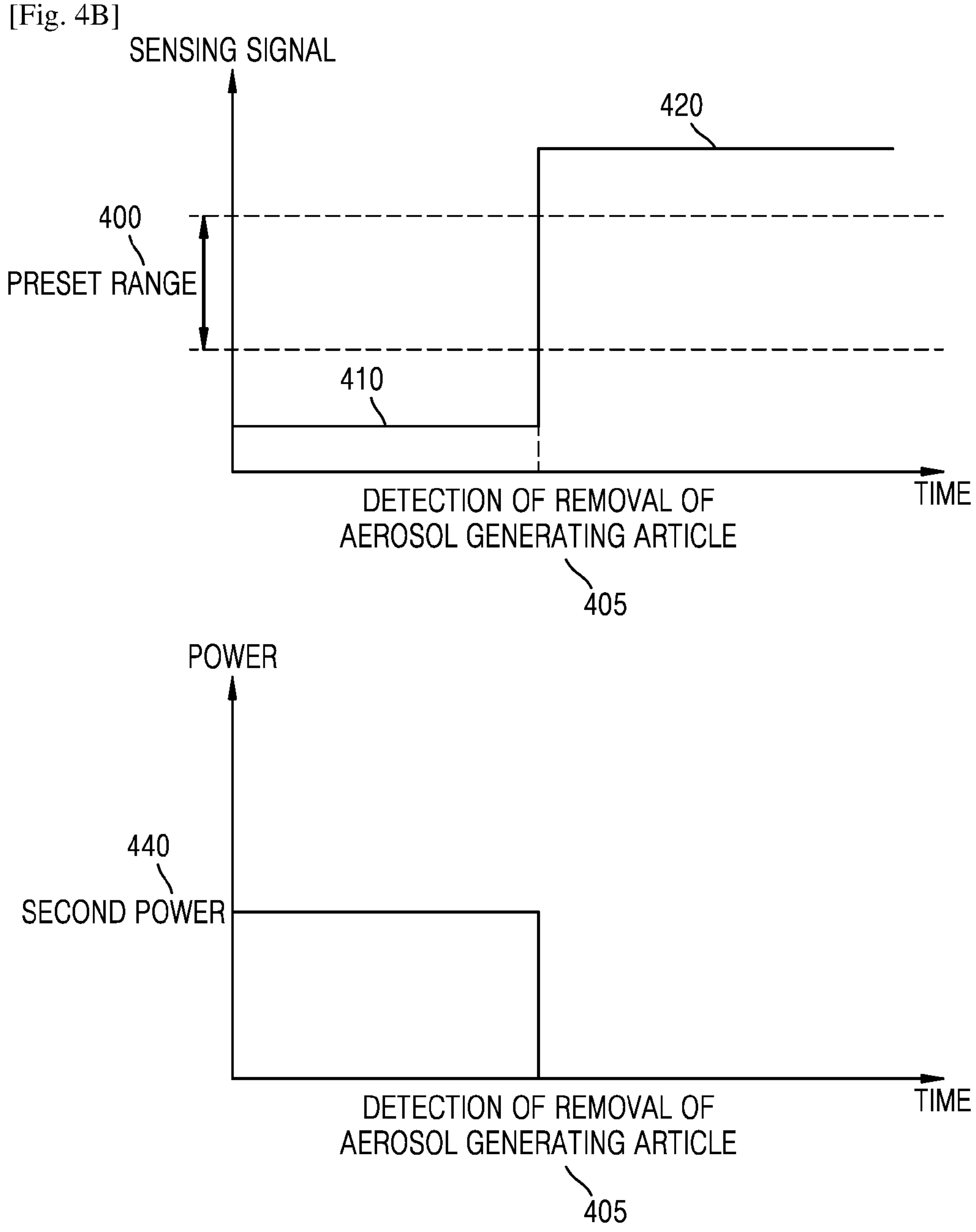

[Fig. 5]
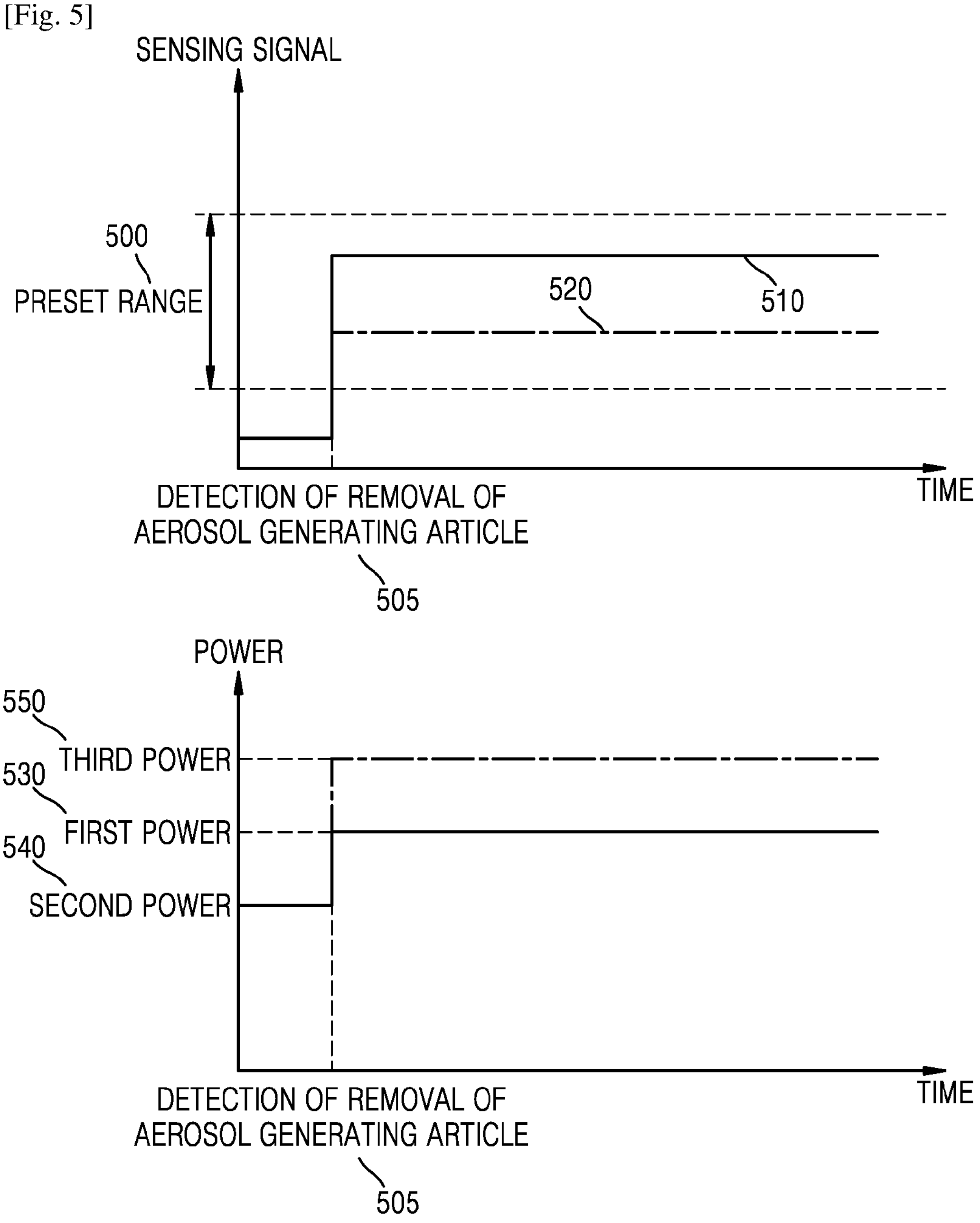

[Fig. 6]
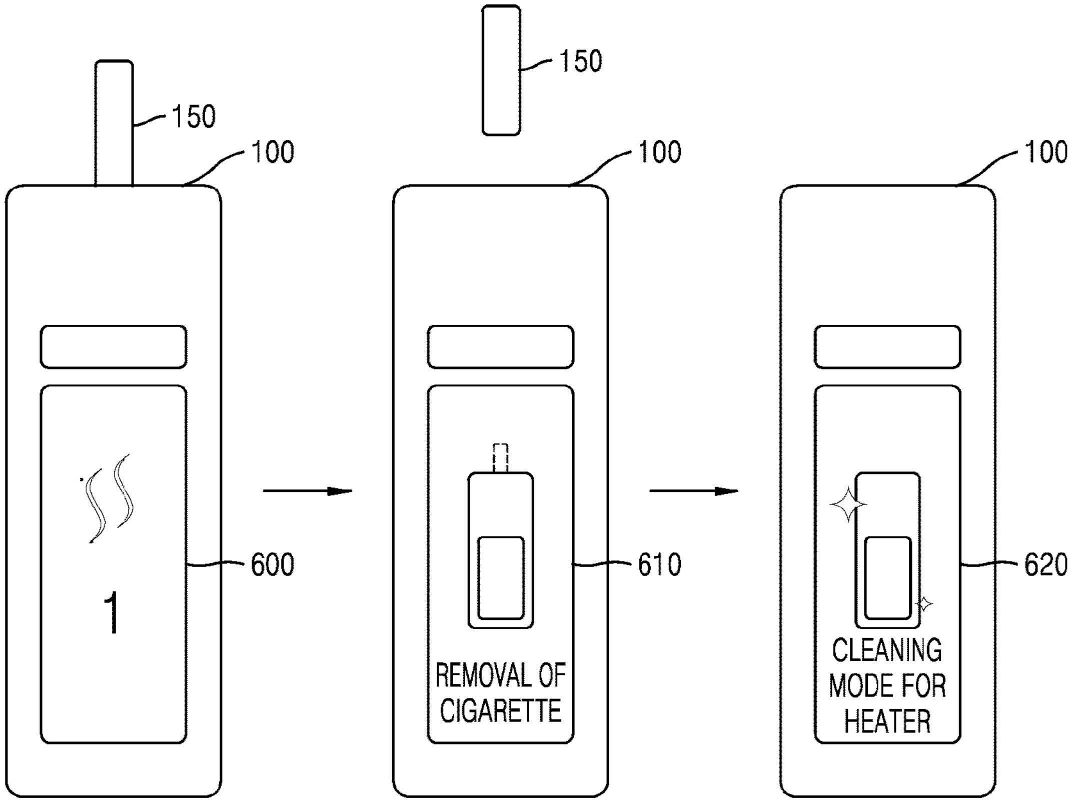
[Fig. 7]
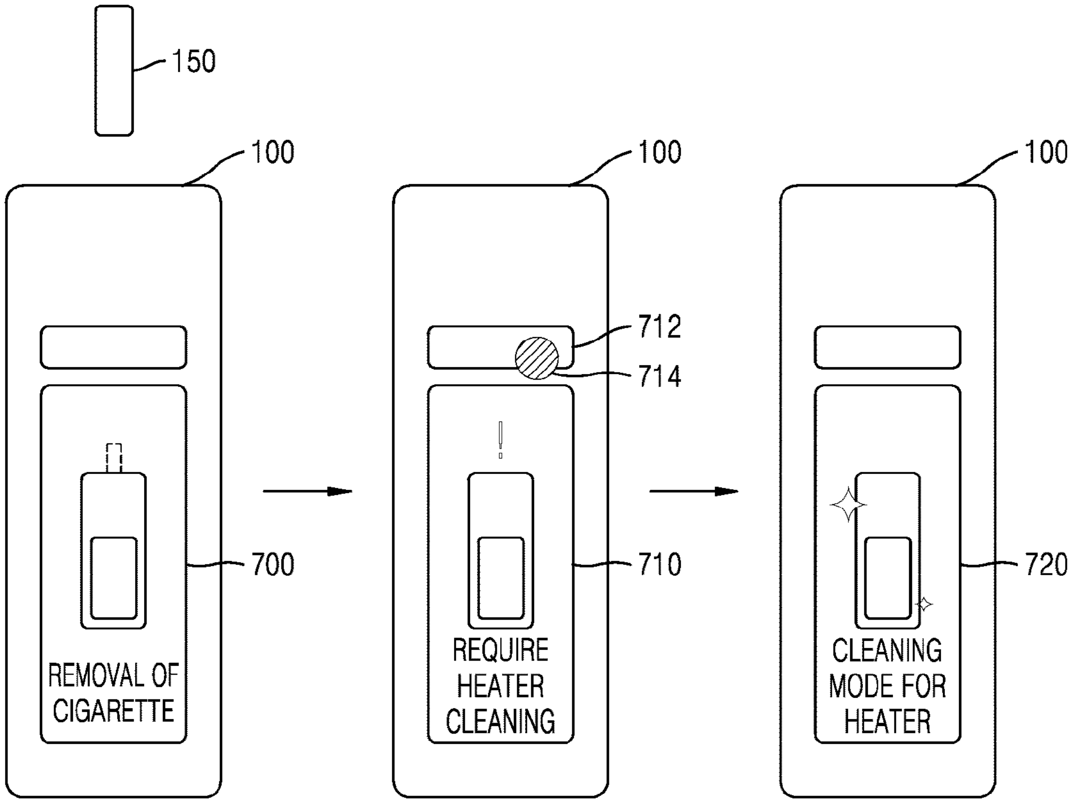

[Fig. 8]
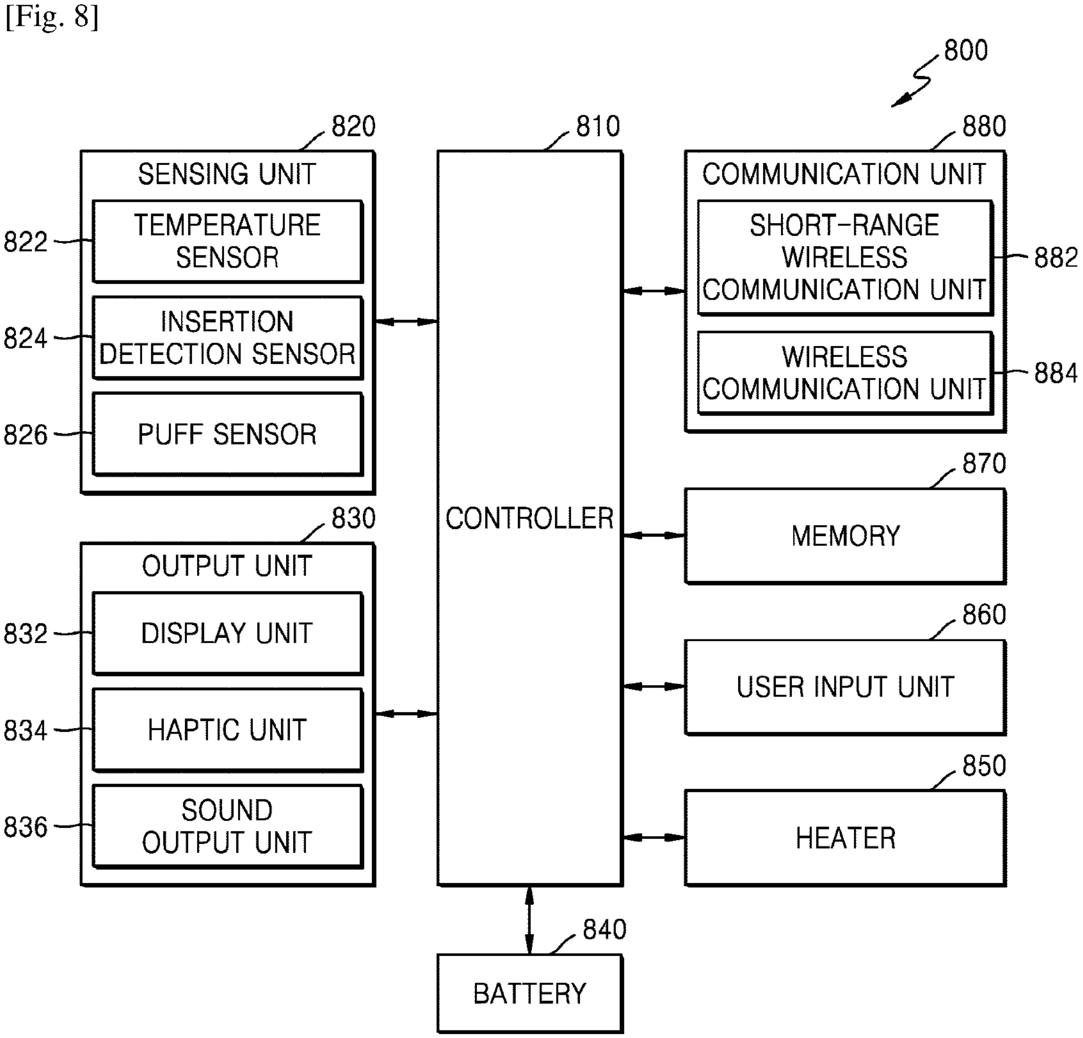

AEROSOL GENERATING DEVICE FOR CONTROLLING POWER SUPPLY TO HEATER AND OPERATING METHOD THEREOF

TECHNICAL FIELD

One or more embodiments relate to an aerosol generating device for controlling the power supply to a heater on the basis of a change in capacitance, and an operating method of the aerosol generating device.

BACKGROUND ART

Recently, the demand for alternative methods for overcoming the shortcomings of general cigarettes has increased. For example, there is an increasing demand for a system for generating aerosols by heating a cigarette or an aerosol generating material by using an aerosol generating device, rather than by burning cigarettes.

Foreign substances may be generated in the process of heating an aerosol generating article (e.g., a cigarette). When smoking takes place with the foreign substances left in the aerosol generating device, the performance of an aerosol generating device is reduced. Accordingly, an amount of aerosols may be reduced and a burnt taste of the aerosols may increase, thereby impairing a user's smoking satisfaction. Therefore, the user needs to periodically clean the aerosol generating device.

A user may clean an aerosol generating device with a cleaning tool (e.g., a cleaner). Also, a user may clean an aerosol generating device by a heat-cleaning method. Specifically, the foreign substances adhered to a heater may be removed by heating the heater to a high temperature. As the heat-cleaning method does not require a separate cleaning tool, the user may easily clean the aerosol generating device.

DISCLOSURE OF INVENTION

Technical Problem

When it comes to a heat-cleaning method, it is difficult for a user to know an appropriate timing for cleaning an aerosol generating device. In general, a heat-cleaning method is performed according to a subjective judgment of the user, or is performed when the aerosol generating device is mounted on a separate charging device (e.g., a cradle). That is, the heat-cleaning method is generally performed without considering an amount of foreign substances generated inside the aerosol generating device. Accordingly, the user may use the aerosol generating device in a poor cleaning condition, and the performance of the aerosol generating device may be rapidly degraded.

The technical problems to be solved by the embodiments of the present disclosure are not limited to the above-described problems, and problems that are not mentioned will be clearly understood by those of ordinary skill in the art from the present disclosure and the accompanying drawings.

Solution to Problem

According to an aspect of the present disclosure, an aerosol generating device may include a heater configured to heat at least a portion of an aerosol generating article, a sensor configured to generate a sensing signal corresponding to a change in capacitance of an accommodation space into which the aerosol generating article is inserted, and a processor electrically connected to the heater and the sensor, wherein the processor may be configured to detect whether the sensing signal obtained from the sensor falls within a preset range, and supply first power to the heater based on the sensing signal being within the preset range.

According to another aspect of the present disclosure, an operating method of an aerosol generating device may include obtaining, from a sensor, a sensing signal corresponding to a change in capacitance of an accommodation space into which an aerosol generating article is inserted, detecting whether the sensing signal falls within a preset range, and supplying first power to a heater based on the sensing signal being within the preset range.

Advantageous Effects of Invention

According to various embodiments of the present disclosure, performance degradation of an aerosol generating device may be prevented by automatically performing heat-cleaning on a heater based on a sensing signal corresponding to a change in capacitance.

In addition, according to various embodiments of the present disclosure, power may be saved and the time required for heat-cleaning a heater may be shortened by executing a cleaning mode when the heater is already heated to a high temperature for generating aerosols.

However, technical problems to be solved by the embodiments are not limited to the above-described problems, and problems that are not mentioned will be clearly understood by those of ordinary skill in the art from the present disclosure and the accompanying drawings.

BRIEF DESCRIPTION OF DRAWINGS

FIG. 1 is a block diagram of an aerosol generating device according to an embodiment.

FIG. 2 is a flowchart illustrating a method by which an aerosol generating device controls power supply.

FIG. 3A shows an example illustrating a first state of an aerosol generating device according to an embodiment.

FIG. 3B shows an example for explaining a method by which the aerosol generating device of FIG. 3A controls power on the basis of a sensing signal.

FIG. 4A shows an example illustrating a second state of an aerosol generating device according to an embodiment.

FIG. 4B shows an example for explaining a method by which the aerosol generating device of FIG. 4A controls power on the basis of a sensing signal.

FIG. 5 shows an example for explaining a method by which an aerosol generating device according to an embodiment controls power on the basis of a sensing signal.

FIG. 6 shows an example illustrating display states of an aerosol generating device according to an embodiment.

FIG. 7 shows an example illustrating display states of an aerosol generating device according to another embodiment.

FIG. 8 is a block diagram of an aerosol generating device according to another embodiment.

BEST MODE FOR CARRYING OUT THE INVENTION

Regarding the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, terms which can be arbitrarily selected by the applicant in particular cases. In such a case, the meaning of the terms will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, hen an expression such as "at least any one" precedes arranged elements, it modifies all elements rather than each arranged element. For example, the expression "at least any one of a, b, and c" should be construed to include a, b, c, or a and b, a and c, b and c, or a, b, and c.

In an embodiment, an aerosol generating device may be a device that generates aerosols by electrically heating a cigarette accommodated in an interior space thereof.

The aerosol generating device may include a heater. In an embodiment, the heater may be an electro-resistive heater. For example, the heater may include an electrically conductive track, and the heater may be heated when currents flow through the electrically conductive track.

The heater may include a tube-shaped heating element, a plate-shaped heating element, a needle-shaped heating element, or a rod-shaped heating element, and may heat the inside or outside of a cigarette according to the shape of a heating element.

A cigarette may include a tobacco rod and a filter rod. The tobacco rod may be formed of sheets, strands, and tiny bits cut from a tobacco sheet. Also, the tobacco rod may be surrounded by a heat conductive material. For example, the heat conductive material may be, but is not limited to, a metal foil such as aluminum foil.

The filter rod may include a cellulose acetate filter. The filter rod may include at least one segment. For example, the filter rod may include a first segment configured to cool aerosols, and a second segment configured to filter a certain component in aerosols.

In another embodiment, the aerosol generating device may be a device that generates aerosols by using a cartridge containing an aerosol generating material.

The aerosol generating device may include a cartridge that contains an aerosol generating material, and a main body that supports the cartridge. The cartridge may be detachably coupled to the main body, but is not limited thereto. The cartridge may be integrally formed or assembled with the main body, and may also be fixed to the main body so as not to be detached from the main body by a user. The cartridge may be mounted on the main body while accommodating an aerosol generating material therein. However, the present disclosure is not limited thereto. An aerosol generating material may also be injected into the cartridge while the cartridge is coupled to the main body.

The cartridge may contain an aerosol generating material in any one of various states, such as a liquid state, a solid state, a gaseous state, a gel state, or the like. The aerosol generating material may include a liquid composition. For example, the liquid composition may be a liquid including a tobacco-containing material having a volatile tobacco flavor component, or a liquid including a non-tobacco material.

The cartridge may be operated by an electrical signal or a wireless signal transmitted from the main body to perform a function of generating aerosols by converting the phase of an aerosol generating material inside the cartridge into a gaseous phase. The aerosols may refer to a gas in which vaporized particles generated from an aerosol generating material are mixed with air.

In another embodiment, the aerosol generating device may generate aerosols by heating a liquid composition, and generated aerosols may be delivered to a user through a cigarette. That is, the aerosols generated from the liquid composition may move along an airflow passage of the aerosol generating device, and the airflow passage may be configured to allow aerosols to be delivered to a user by passing through a cigarette.

In another embodiment, the aerosol generating device may be a device that generates aerosols from an aerosol generating material by using an ultrasonic vibration method. At this time, the ultrasonic vibration method may mean a method of generating aerosols by converting an aerosol generating material into aerosols with ultrasonic vibration generated by a vibrator.

The aerosol generating device may include a vibrator, and generate a short-period vibration through the vibrator to convert an aerosol generating material into aerosols. The vibration generated by the vibrator may be ultrasonic vibration, and the frequency band of the ultrasonic vibration may be in a frequency band of about 100 kHz to about 3.5 MHz, but is not limited thereto.

The aerosol generating device may further include a wick that absorbs an aerosol generating material. For example, the wick may be arranged to surround at least one area of the vibrator, or may be arranged to contact at least one area of the vibrator.

As a voltage (for example, an alternating voltage) is applied to the vibrator, heat and/or ultrasonic vibrations may be generated from the vibrator, and the heat and/or ultrasonic vibrations generated from the vibrator may be transmitted to the aerosol generating material absorbed in the wick. The aerosol generating material absorbed in the wick may be converted into a gaseous phase by heat and/or ultrasonic vibrations transmitted from the vibrator, and as a result, aerosols may be generated.

For example, the viscosity of the aerosol generating material absorbed in the wick may be lowered by the heat generated by the vibrator, and as the aerosol generating material having a lowered viscosity is granulated by the ultrasonic vibrations generated from the vibrator, aerosols may be generated, but is not limited thereto.

In another embodiment, the aerosol generating device is a device that generates aerosols by heating an aerosol generating article accommodated in the aerosol generating device in an induction heating method.

The aerosol generating device may include a susceptor and a coil. In an embodiment, the coil may apply a magnetic field to the susceptor. As power is supplied to the coil from the aerosol generating device, a magnetic field may be formed inside the coil. In an embodiment, the suspector may be a magnetic body that generates heat by an external magnetic field. As the suspector is positioned inside the coil and a magnetic field is applied to the suspector, the suspector generates heat to heat an aerosol generating article. In addition, optionally, the suspector may be positioned within the aerosol generating article.

In another embodiment, the aerosol generating device may further include a cradle.

The aerosol generating device may configure a system together with a separate cradle. For example, the cradle may charge a battery of the aerosol generating device. Alternatively, the heater may be heated when the cradle and the aerosol generating device are coupled to each other.

Hereinafter, the present disclosure will now be described more fully with reference to the accompanying drawings, in which exemplary embodiments of the present disclosure are shown such that one of ordinary skill in the art may easily work the present disclosure. The present disclosure may be implemented in a form that can be implemented in the aerosol generating devices of the various embodiments described above or may be implemented in various different forms, and is not limited to the embodiments described herein.

Hereinafter, embodiments of the present disclosure will be described in detail with reference to the drawings.

FIG. 1 is a block diagram of an aerosol generating device 100 according to an embodiment.

Referring to FIG. 1, the aerosol generating device 100 may include a processor 110, a heater 120, and a sensor 130. Components of the aerosol generating device 100 according to an embodiment are not limited thereto, and other components may be added or at least one component may be omitted according to an embodiment.

In an embodiment, the heater 120 may beat at least a portion of an aerosol generating article. For example, the heater 120 may heat at least a portion of the aerosol generating article as power is supplied under control of the processor 110. The at least a portion of the aerosol generating article may refer to a tobacco rod including at least one of an aerosol generating article and a tobacco material.

In an embodiment, the heater 120 may be an internal-heating-type heater that is inserted into an aerosol generating article and heats the aerosol generating article. For example, the heater 120 may be a heater blade having a pointed end that is inserted into the aerosol generating article to heat a tobacco rod of the aerosol generating article (e.g., a cigarette) when an aerosol generating article is inserted into an accommodation space within the aerosol generating device 100. However, the heater 120 in the present disclosure is not limited to the internal-heating-type heater, and may be a heater of various types, such as an external-heating type or an induction-heating type.

In an embodiment, when smoking on an aerosol generating article is finished, foreign substances may be adhered to at least a portion of an outer surface of the heater 120. Here, the 'foreign substance' may mean an organic compound (e.g., cigarette ash) attached to the heater 120 after the aerosol generating article is heated. For example, when the heater 120 is an internal-heating-type heating blade, the heater 120 may heat while being in contact with an aerosol generating material and/or tobacco material contained in an aerosol generating article. Foreign substances may be generated as the tobacco material contained in the aerosol generating article is heated to a high temperature, and may adhere to the outer surface of the heater 120 after heating is finished. An amount of foreign substances adhered to the heater 120 may differ according to the type, state, cleaning cycle, or the like of an aerosol generating article.

In an embodiment, the sensor 130 may be a capacitive sensor that senses a change in capacitance. For example, the sensor 130 may sense a change in capacitance in an accommodation space into which an aerosol generating article is inserted. In addition, the sensor 130 may generate a sensing signal corresponding to the sensed change in capacitance. In the present disclosure, a 'sensing signal' may mean a voltage change signal, a frequency change signal, or a charge/discharge time change signal corresponding to a change in capacitance in the accommodation space.

In an embodiment, the processor 110 may obtain various pieces of data on the basis of a generated sensing signal. For example, based on the sensing signal, the processor 110 may obtain data on whether an aerosol generating article is removed, data on whether there is a foreign substance in an accommodation space, data on an amount of foreign substances, etc.

In an embodiment, the sensor 130 may include at least one electrode made of a metal thin film. For example, the sensor 130 may include at least one electrode made of copper foil.

In an embodiment, the processor 110 may supply power to the heater 120 on the basis of a sensing signal obtained from the sensor 130, which will be described in detail below.

FIG. 2 is a flowchart illustrating a method by which an aerosol generating device controls power supply.

Referring to FIG. 2, in operation 201, a processor (e.g., the processor 110 of FIG. 1) of an aerosol generating device (e.g., the aerosol generating device 100 of FIG. 1) may obtain a sensing signal corresponding to a change in capacitance of an accommodation space from a sensor (e.g., the sensor 130 of FIG. 1). The accommodation space may mean a space formed in a portion of the aerosol generating device 100 such that an aerosol generating article may be inserted.

In an embodiment, the processor 110 may obtain a voltage change signal as a sensing signal corresponding to a change in capacitance from the sensor 130. For example, when a capacitance in an accommodation space decreases by a first change amount as an aerosol generating article is removed from the accommodation space, the processor 110 may obtain a voltage change signal corresponding to the first change amount from the sensor 130. The obtained voltage change signal may include data on an amount of a voltage increase that has occurred as a charging voltage of the sensor 130 decreases.

In another embodiment, the processor 110 may also obtain a frequency change signal as a sensing signal corresponding to a change in capacitance from the sensor 130. For example, when a capacitance in an accommodation space decreases by a first change amount as an aerosol generating article is removed from the accommodation space, the processor 110 may obtain a frequency change signal corresponding to the first change amount from the sensor 130. The obtained frequency change signal may include data on an amount of a frequency increase that has occurred as an oscillation frequency decreases in an oscillation circuit connected to the sensor 130.

In another embodiment, the processor 110 may also generate a charge/discharge time change signal as a sensing signal corresponding to a change in capacitance from the sensor 130. For example, when a capacitance in an accommodation space decreases by a first change amount as an aerosol generating article is removed from the accommodation space, the processor 110 may obtain a charge/discharge time change signal corresponding to the first change amount from the sensor 130. The obtained charge/discharge time change signal may include data on an amount of a charge/discharge time increase that has occurred as a charging time for the sensor 130 decreases (or as a discharging time increases).

According to an embodiment, in operation 203, the processor 110 may detect whether a sensing signal is within a preset range. For example, when the sensing signal is a voltage change signal, the processor 110 may detect whether the sensing signal falls within a preset voltage change range. As another example, when the sensing signal is a frequency change signal, the processor 110 may detect whether the sensing signal falls within a preset frequency change range. As another example, when the sensing signal is a charge/discharge time change signal, the processor 110 may detect whether the sensing signal falls within a preset charge/discharge time change range.

In an embodiment, the processor 110 may store preset range data for a sensing signal in a memory (not shown). The preset range data may be used for determining whether to execute a cleaning mode for a heater (e.g., the beater 120 of FIG. 1) after a user's smoking on an aerosol generating article is finished. When a sensing signal falls within a preset range, the processor 110 may execute a cleaning mode for the heater 120.

In an embodiment, preset range data may be set based on an amount of foreign substances that requires cleaning of the heater 120. That is, the preset range data may be preset by a manufacturer on the basis of an amount of foreign substances that is determined to require heat-cleaning of the heater 120. In an embodiment, the processor 110 may compare a sensing signal obtained from the sensor 130 with preset range data stored in a memory to detect whether the sensing signal falls within a preset range.

For example, when an aerosol generating article is removed from the aerosol generating device 100 after being heated, an amount of foreign substances adhered to the heater 120 may be a first value (e.g., 5 g). The sensor 130 may sense a first capacitance change of an accommodation space that occurs as an aerosol generating article is removed. Here, the first capacitance change may mean a difference between a capacitance in a state in which an aerosol generating article is present in an accommodation space and a capacitance in a state in which foreign substances in an amount of the first value exist in the accommodation space. The processor 110 may obtain a first sensing signal corresponding to the first capacitance change from the sensor 130. The processor 110 may compare the obtained first sensing signal with preset range data stored in a memory to detect whether the first sensing signal falls within a preset range.

As another example, when an aerosol generating article is removed from the aerosol generating device 100 after being heated, an amount of foreign substances adhered to the heater 120 may be a second value (e.g., 1 g) that is less than the first value. The sensor 130 may sense a second capacitance change that occurs as an aerosol generating article is removed. Here, the second capacitance change may mean a difference between a capacitance in a state in which an aerosol generating article is inserted in an accommodation space and a capacitance in a state in which foreign substances in an amount of the second value exist in the accommodation space. The processor 110 may obtain a second sensing signal corresponding to the second capacitance change from the sensor 130. The processor 110 may compare the obtained second sensing signal with preset range data to detect that the second sensing signal does not fall within a preset range.

According to an embodiment, in operation 205, the processor 110 may supply first power to the heater 120 when a sensing signal obtained from the sensor 130 falls within a preset range. In the present disclosure, the 'first power' may mean an amount of power that is able to separate a material attached to the heater 120 from the heater 120. That is, the 'first power' may mean an amount of power required to heat the heater 120 to a preset temperature (e.g., about 450° C. or higher) to remove foreign substances adhered to the heater 120.

FIG. 3A shows an example illustrating a first state of the aerosol generating device 100 according to an embodiment.

Referring to FIG. 3A, the aerosol generating device 100 may include the processor 110, the heater 120, and a sensor (e.g., the sensor 130 of FIG. 1). The sensor 130 may include two electrodes **130*a* and 130*b* for sensing a change in capacitance of an accommodation space 140 and generating a sensing signal accordingly. The two electrodes 130*a* and 130*b* may be arranged to surround at least a portion of the accommodation space 140. However, the number of electrodes in the sensor 130 is not limited thereto. For example, the sensor 130 may also include only one electrode arranged to surround at least a portion of the accommodation space 140**.

In an embodiment, the sensor 130 may generate a sensing signal corresponding to a change in capacitance of the accommodation space 140. For example, when an aerosol generating article 150 is inserted into the accommodation space 140, a first capacitance $C_1$ may exist between the two electrodes **130*a* and 130*b*. Here, the first capacitance $C_1$ may exist due to the permittivity of the aerosol generating article 150. Then, when the aerosol generating article 150 is removed from the accommodation space 140, a second capacitance $C_2$ may exist between the two electrodes 130*a* and 130*b*. The second capacitance $C_2$ may exist due to the permittivity of a foreign substance 152 that remains after the aerosol generating article 150 has been removed. In an embodiment, the sensor 130 may generate a sensing signal corresponding to a change in capacitance C, which is a difference between the first capacitance $C_1$ and the second capacitance $C_2$ The foreign substance 152 of FIG. 3A may be a large amount of organic compounds that reduce the performance of the aerosol generating device 100 or cause a burnt taste in aerosols when heated while being adhered to the heater 120**.

In an embodiment, the processor 110 may supply first power to the heater 120 on the basis of a sensing signal obtained from the sensor 130. As aforementioned, the 'first power' may mean an amount of power supplied to the heater 120 so that a material attached to the heater 120 is separated from the heater 120.

For example, a sensing signal obtained from the sensor 130 may be a voltage change signal indicating 2.2 V decrease, and a preset voltage change range may be about 0.5 V to about 3 V. In this case, the processor 110 may supply first power to the heater 120 because the sensing signal corresponds to the preset voltage change range.

As another example, a sensing signal obtained from the sensor 130 may be a frequency change signal indicating 1 MHz decrease, and a preset frequency change range may be about 500 KHz to about 2 MHz. In this case, the processor 110 may supply first power to the heater 120 because the sensing signal corresponds to the preset frequency change range.

As another example, a sensing signal obtained from the sensor 130 may be a charging time change signal indicating 1 second decrease (or a discharging time change signal indicating 1 second increase), and a preset charge/discharge time change range may be about 0.2 seconds to about 1.5 seconds. In this case, the processor 110 may supply first power to the heater 120 because the sensing signal corresponds to the preset charge/discharge time change range.

In an embodiment, as the heater 120 is heated to a high temperature (e.g., about 450° C. or higher) by receiving the first power, the foreign substance 152 adhered to the outer surface of the heater 120 may be removed.

FIG. 3B shows an example for explaining a method by which the aerosol generating device 100 of FIG. 3A controls power on the basis of a sensing signal. In the description of FIG. 3B, descriptions similar to those already given above will be omitted.

Referring to FIG. 3B, before detection 305 of removal of an aerosol generating article (e.g., a cigarette), a processor (e.g., the processor 110 of FIG. 3A) may supply second power 340 to a heater (e.g., the heater 120 of FIG. 3A). In the present disclosure, the 'second power 340' may mean an amount of power corresponding to a temperature profile for heating an aerosol generating article. For example, when a sensing signal 310 obtained from the sensor 130 is less than a minimum value of a preset range 300, the processor 110 may supply the second power 340 to the heater 120 to heat an aerosol generating article (e.g., the aerosol generating article 150 of FIG. 3A), according to a temperature profile.

In an embodiment, after the detection 305 of the removal of the aerosol generating article 150, the processor 110 may supply first power 330 that is greater than the second power 340 to the heater 120 on the basis of a sensing signal 320. In the present disclosure, the 'first power 330' may mean an amount of power required to heat the heater 120 to a preset temperature to remove foreign substances adhered to the heater 120. For example, when the sensing signal 320 obtained from the sensor 130 falls within the preset range 300, the processor 110 may supply the first power 330 to the heater 120 to execute a cleaning mode for the heater 120.

FIG. 4A shows an example illustrating a second state of the aerosol generating device 100 according to an embodiment. In the description of FIG. 4A, descriptions similar to those already given above will be omitted.

Referring to FIG. 4A, the aerosol generating device 100 may include the processor 110, the heater 120, and a sensor (e.g., the sensor 130 of FIG. 1). For example, the sensor 130 may include two electrodes 130*a* and 130*b* for sensing a change in capacitance of an accommodation space 140 and generating a sensing signal accordingly. The two electrodes 130*a* and 130*b* may be arranged to surround at least a portion of the accommodation space 140.

In an embodiment, the sensor 130 may generate a sensing signal corresponding to a change in capacitance of the accommodation space 140. For example, when an aerosol generating article 150 is inserted into the accommodation space 140, a first capacitance $C_1$ may exist between the two electrodes 130*a* and 130*b*. Here, the first capacitance $C_1$ may exist due to the permittivity of the aerosol generating article 150. Then, when the aerosol generating article 150 is removed from the accommodation space 140, a third capacitance $C_3$ may exist between the two electrodes 130*a* and 130*b*. Here, the third capacitance $C_3$ may exist due to the permittivity of a foreign substance 154 that remains after the aerosol generating article 150 has been removed. In an embodiment, the sensor 130 may generate a sensing signal corresponding to a change in capacitance C, which is a difference between the first capacitance $C_1$ and the third capacitance $C_3$.

The foreign substance 154 of FIG. 4A may be a small amount of organic compounds that do not reduce the performance of the aerosol generating device 100 or cause a burnt taste in aerosols even if it is heated while being adhered to the heater 120.

In an embodiment, the processor 110 may block power supply to the heater 120 on the basis of a sensing signal obtained from the sensor 130.

For example, a sensing signal obtained from the sensor 130 may be a voltage change signal indicating 3.2 V decrease, and a preset voltage change range may be about 0.5 V to about 3 V. In this case, the processor 110 may block power supply to the heater 120 because the sensing signal does not correspond to the preset voltage change range.

As another example, a sensing signal obtained from the sensor 130 may be a frequency change signal indicating 2.5 MHz decrease, and a preset frequency change range may be about 500 KHz to about 2 MHz. In this case, the processor 110 may block power supply to the heater 120 because the sensing signal does not correspond to the preset frequency change range.

As another example, a sensing signal obtained from the sensor 130 may be a charging time change signal indicating 1.8 seconds decrease (or a discharging time change signal indicating 1.8 seconds increase), and a preset charge/discharge time change range may be about 0.2 seconds to about 1.5 seconds. In this case, the processor 110 may block power supply to the heater 120 because the sensing signal does not correspond to the preset charge/discharge time change range.

FIG. 4B shows an example for explaining a method by which the aerosol generating device of FIG. 4A controls power on the basis of a sensing signal. In the description of FIG. 4B, descriptions similar to those already given above will be omitted.

Referring to FIG. 4B, before detection 405 of removal of an aerosol generating article (e.g., a cigarette), a processor (e.g., the processor 110 of FIG. 4A) may supply second power 440 to a heater (e.g., the heater 120 of FIG. 4A). In the present disclosure, the 'second power 440' may mean an amount of power corresponding to a temperature profile for heating an aerosol generating article. For example, when a sensing signal 410 obtained from the sensor 130 is less than a minimum value of a preset range 400, the processor 110 may supply the second power 440 to the heater 120 to heat an aerosol generating article (e.g., the aerosol generating article 150 of FIG. 4A), according to a temperature profile.

In an embodiment, after the detection 405 of the removal of the aerosol generating article 150, the processor 110 may block power supply to the heater 120 on the basis of a sensing signal 420. For example, when the sensing signal 420 obtained from the sensor 130 exceeds a maximum value of the preset range 400, the processor 110 may block power supply to the heater 120 to stop a heating operation of the heater 120.

FIG. 5 shows an example for explaining a method by which an aerosol generating device according to an embodiment controls power on the basis of a sensing signal. In the description of FIG. 5, descriptions similar to those already given above will be omitted.

Referring to FIG. 5, when a sensing signal obtained from a sensor (e.g., the sensor 130 of FIG. 1) falls within a preset range 500, a processor (e.g., the processor 110 of FIG. 1) may supply power corresponding to the obtained sensing signal to a heater (e.g., the heater 120 of FIG. 1).

In an embodiment, before detection 505 of removal of an aerosol generating article (e.g., a cigarette), the processor 110 may supply second power 540 to the heater 120. In an embodiment, after the detection 505 of the removal of the aerosol generating article, the processor 110 may supply power that is greater than the second power 540 to the heater 120.

For example, when a first sensing signal 510 in the preset range 500 is obtained from the sensor 130, the processor 110 may supply first power 530 corresponding to the first sensing signal 510 to the heater 120. Here, the first sensing signal 510 may be a sensing signal corresponding to a first capacitance change. That is, the first sensing signal 510 may be a sensing signal corresponding to the first capacitance change, which is a difference between a capacitance in a state in which an aerosol generating article is inserted into an accommodation space and a capacitance in a state in which a foreign substance in an amount of a first value (e.g., 5 g) exists.

As another example, when a third sensing signal 520 in the preset range 500 is obtained from the sensor 130, the processor 110 may supply third power 550 corresponding to the third sensing signal 520 to the heater 120. Here, the third sensing signal 520 may be a sensing signal corresponding to a third capacitance change. That is, the third sensing signal 520 may be a sensing signal corresponding to the third capacitance change, which is a difference between a capacitance in a state in which an aerosol generating article is inserted into an accommodation space and a capacitance in a state in which a foreign substance in an amount of a third value (e.g., 6.5 g) exists. That is, an amount of foreign substances adhered to the heater 120 when the third sensing signal 520 is obtained from the sensor 130 may be greater than an amount of foreign substances adhered to the heater 120 when the first sensing signal 510 is obtained from the sensor 130. Accordingly, the third power 550 corresponding to the third sensing signal 520 may be greater than the first power 530 corresponding to the first sensing signal 510.

FIG. 6 shows an example illustrating display states of the aerosol generating device 100 according to an embodiment.

Referring to FIG. 6, a processor (e.g., the processor 110 of FIG. 1) of the aerosol generating device 100 may display an operational user interface (UI) through a display. For example, when the aerosol generating article 150 is being heated in the aerosol generating device 100 during smoking of a user, the processor 110 may display a first UI screen 600 through the display. The first UI screen 600 may be a UI screen indicating a remaining number of puffs of the aerosol generating article 150.

In an embodiment, when the aerosol generating article 150 is removed from the aerosol generating device 100, the processor 110 may display a second UI screen 610 through the display. The second UI screen 610 may be a UI screen including an icon and/or a phrase (e.g., 'removal of cigarette' or the like) indicating that the aerosol generating article 150 is removed.

In an embodiment, after the aerosol generating article 150 is removed from the aerosol generating device 100, the processor 110 may execute a cleaning mode for a heater (e.g., the heater 120 of FIG. 1) on the basis of a sensing signal obtained from a sensor (the sensor 130 of FIG. 1). The processor 110 may supply first power to the heater 120 to execute a cleaning mode for the heater 120. In an embodiment, the processor 110 may display a third UI screen 620 through the display when supply of the first power to the heater 120 is started. The third UI screen 620 may be a UI screen including an icon or the like indicating that a cleaning mode for a heater is started.

In an embodiment, the processor 110 may display the second UI screen 610 when a preset time has passed after the third UI screen 620 is displayed. That is, if a sensing signal in a preset range is obtained from the sensor 130 falls within a preset range, the processor 110 may execute a cleaning mode for the heater 120 after a preset time. Accordingly, even when the aerosol generating article 150 is removed from the aerosol generating device 100 by the user's mistake, a certain grace period is applied, so that power consumption due to the unintentional execution of a cleaning mode for the heater 120 may be prevented.

FIG. 7 shows an example illustrating display states of the aerosol generating device 100 according to another embodiment.

Referring to FIG. 7, a processor (e.g., the processor 110 of FIG. 1) of the aerosol generating device 100 may display an operational UI screen through a display. For example, when the aerosol generating article 150 is removed from the aerosol generating device 100, the processor 110 may display a fourth UI screen 700 through the display. The fourth UI screen 700 may be the same as the second UI screen 610 of FIG. 6.

In an embodiment, the processor 110 may output a notification on the basis of a sensing signal obtained from a sensor (e.g., the sensor 130 of FIG. 1). For example, when a sensing signal obtained from the sensor 130 falls within a preset range, the processor 110 may output a notification to the user through an output interface (e.g., a display, a motor, a speaker, or the like). At this time, the notification may include at least one of visual information output through the display, tactile information output through the motor, and auditory information output through the speaker.

In an embodiment, when a sensing signal obtained from the sensor 130 falls within a preset range, the processor 110 may display a fifth UI screen 710 through a display. The fifth UI screen 710 may be a UI screen including an icon and/or a phrase (e.g., 'require cleaning for heater' or the like) indicating that cleaning of the heater 120 is needed. The fifth UI screen 710 may correspond to visual information output through the display among the example notifications described above.

In an embodiment, the processor 110 may receive a user input 714 in response to the notification. For example, the processor 110 may receive the user input 714 through a physical button 712 formed on a portion of the aerosol generating device 100.

In an embodiment, when the user input 714 is received through the physical button 712, the processor 110 may display a sixth UI screen 720 through a display. The sixth UI screen 720 may be a UI screen including an icon or the like indicating that a cleaning mode for a heater is started. For example, the sixth UI screen 720 may be the same as the third UI screen 650 of FIG. 6.

FIG. 8 is a block diagram of an aerosol generating device 800 according to another embodiment.

The aerosol generating device 800 may include a controller 810, a sensing unit 820, an output unit 830, a battery 840, a heater 850, a user input unit 860, a memory 870, and a communication unit 880. However, the internal structure of the aerosol generating device 800 is not limited to those illustrated in FIG. 8. That is, according to the design of the aerosol generating device 800, it will be understood by one of ordinary skill in the art that some of the components shown in FIG. 8 may be omitted or new components may be added.

The sensing unit 820 may sense a state of the aerosol generating device 800 and a state around the aerosol generating device 800, and transmit sensed information to the controller 810. Based on the sensed information, the controller 810 may control the aerosol generating device 800 to perform various functions, such as controlling an operation of the heater 850, limiting smoking, determining whether an aerosol generating article (e.g., a cigarette, a cartridge, or the like) is inserted, displaying a notification, or the like.

The sensing unit 820 may include at least one of a temperature sensor 822, an insertion detection sensor, and a puff sensor 826, but is not limited thereto.

The temperature sensor 822 may sense a temperature at which the heater 850 (or an aerosol generating material) is heated. The aerosol generating device 800 may include a separate temperature sensor for sensing the temperature of the heater 850, or the heater 850 may serve as a temperature sensor. Alternatively, the temperature sensor 822 may also be arranged around the battery 840 to monitor the temperature of the battery 840.

The insertion detection sensor 824 may sense insertion and/or removal of an aerosol generating article. For example, the insertion detection sensor 824 may include at least one of a film sensor, a pressure sensor, an optical sensor, a resistive sensor, a capacitive sensor, an inductive sensor, and an infrared sensor, and may sense a signal change according to the insertion and/or removal of an aerosol generating article.

The puff sensor 826 may sense a user's puff on the basis of various physical changes in an airflow passage or an airflow channel. For example, the puff sensor 826 may sense a user's puff on the basis of any one of a temperature change, a flow change, a voltage change, and a pressure change.

The sensing unit 820 may include, in addition to the temperature sensor 822, the insertion detection sensor 824, and the puff sensor 826 described above, at least one of a temperature/humidity sensor, a barometric pressure sensor, a magnetic sensor, an acceleration sensor, a gyroscope sensor, a location sensor (e.g., a global positioning system (GPS)), a proximity sensor, and a red-green-blue (RGB) sensor (illuminance sensor). Because a function of each of sensors may be intuitively inferred by one of ordinary skill in the art from the name of the sensor, a detailed description thereof may be omitted.

The output unit 830 may output information on a state of the aerosol generating device 800 and provide the information to a user. The output unit 830 may include at least one of a display unit 832, a haptic unit 834, and a sound output unit 836, but is not limited thereto. When the display unit 832 and a touch pad form a layered structure to form a touch screen, the display unit 832 may also be used as an input device in addition to an output device.

The display unit 832 may visually provide information about the aerosol generating device 800 to the user. For example, information about the aerosol generating device 800 may mean various pieces of information, such as a charging/discharging state of the battery 840 of the aerosol generating device 800, a preheating state of the heater 850, an insertion/removal state of an aerosol generating article, or a state in which the use of the aerosol generating device 800 is restricted (e.g., sensing of an abnormal object), or the like, and the display unit 832 may output the information to the outside. The display unit 832 may be, for example, a liquid crystal display panel (LCD), an organic light-emitting diode (OLED) display panel, or the like. In addition, the display unit 832 may be in the form of a light-emitting diode (LED) light-emitting device.

The haptic unit 834 may tactilely provide information about the aerosol generating device 800 to the user by converting an electrical signal into a mechanical stimulus or an electrical stimulus. For example, the haptic unit 834 may include a motor, a piezoelectric element, or an electrical stimulation device.

The sound output unit 836 may audibly provide information about the aerosol generating device 800 to the user. For example, the sound output unit 836 may convert an electrical signal into a sound signal and output the same to the outside.

The battery 840 may supply power used to operate the aerosol generating device 800. The battery 840 may supply power such that the heater 850 may be heated. In addition, the battery 840 may supply power required for operations of other components (e.g., the sensing unit 820, the output unit 830, the user input unit 860, the memory 870, and the communication unit 880) in the aerosol generating device 800. The battery 840 may be a rechargeable battery or a disposable battery. For example, the battery 840 may be a lithium polymer (LiPoly) battery, but is not limited thereto.

The heater 850 may receive power from the battery 840 to heat an aerosol generating material. Although not illustrated in FIG. 8, the aerosol generating device 800 may further include a power conversion circuit (e.g., a direct current (DC)/DC converter) that converts power of the battery 840 and supplies the same to the heater 850. In addition, when the aerosol generating device 800 generates aerosols in an induction heating method, the aerosol generating device 800 may further include a DC/alternating current (AC) that converts DC power of the battery 840 into AC power.

The controller 810, the sensing unit 820, the output unit 830, the user input unit 860, the memory 870, and the communication unit 880 may each receive power from the battery 840 to perform a function. Although not illustrated in FIG. 8, the aerosol generating device 800 may further include a power conversion circuit that converts power of the battery 840 to supply the power to respective components, for example, a low dropout (LDO) circuit, or a voltage regulator circuit.

In an embodiment, the heater 850 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, nichrome, or the like, but is not limited thereto. In addition, the heater 850 may be implemented by a metal wire, a metal plate on which an electrically conductive track is arranged, a ceramic heating element, or the like, but is not limited thereto.

In another embodiment, the heater 850 may be a heater of an induction heating type. For example, the heater 850 may include a suspector that heats an aerosol generating material by generating heat through a magnetic field applied by a coil.

The user input unit 860 may receive information input from the user or may output information to the user. For example, the user input unit 860 may include a key pad, a dome switch, a touch pad (a contact capacitive method, a pressure resistance film method, an infrared sensing method, a surface ultrasonic conduction method, an integral tension measurement method, a piezo effect method, or the like), a jog wheel, a jog switch, or the like, but is not limited thereto. In addition, although not illustrated in FIG. 8, the aerosol generating device 800 may further include a connection interface, such as a universal serial bus (USB) interface, and may connect to other external devices through the connection interface, such as the USB interface, to transmit and receive information, or to charge the battery 840.

The memory 870 is a hardware component that stores various types of data processed in the aerosol generating device 800, and may store data processed and data to be processed by the controller 810. The memory 870 may include at least one type of storage medium from among a flash memory type, a hard disk type, a multimedia card micro type memory, a card-type memory (for example, secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk. The memory 870 may store an operation time of the aerosol generating device 800, the maximum number of puffs, the current number of puffs, at least one temperature profile, data on a user's smoking pattern, etc.

The communication unit 880 may include at least one component for communication with another electronic device. For example, the communication unit 880 may include a short-range wireless communication unit 882 and a wireless communication unit 884.

The short-range wireless communication unit 882 may include a Bluetooth communication unit, a Bluetooth Low Energy (BLE) communication unit, a near field communication unit, a wireless LAN (WLAN) (Wi-Fi) communication unit, a Zigbee communication unit, an infrared data association (IrDA) communication unit, a Wi-Fi Direct (WFD) communication unit, an ultra wideband (UWB) communication unit, an Ant+ communication unit, or the like, but is not limited thereto.

The wireless communication unit 884 may include a cellular network communication unit, an Internet communication unit, a computer network (e.g., local area network (LAN) or wide area network (WAN)) communication unit, or the like, but is not limited thereto. The wireless communication unit 884 may also identify and authenticate the aerosol generating device 800 within a communication network by using subscriber information (e.g., International Mobile Subscriber Identifier (IMSI)).

The controller 810 may control general operations of the aerosol generating device 800. In an embodiment, the controller 810 may include at least one processor. The processor may be implemented as an array of a plurality of logic gates or may be implemented as a combination of a general-purpose microprocessor and a memory in which a program executable by the microprocessor is stored. It will be understood by one of ordinary skill in the art that the processor may be implemented in other forms of hardware.

The controller 810 may control the temperature of the heater 850 by controlling supply of power of the battery 840 to the heater 850. For example, the controller 810 may control power supply by controlling switching of a switching element between the battery 840 and the heater 850. In another example, a direct heating circuit may also control power supply to the heater 850 according to a control command of the controller 810.

The controller 810 may analyze a result sensed by the sensing unit 820 and control subsequent processes to be performed. For example, the controller 810 may control power supplied to the heater 850 to start or end an operation of the heater 850 on the basis of a result sensed by the sensing unit 820. As another example, the controller 810 may control, based on a result sensed by the sensing unit 820, an amount of power supplied to the heater 850 and the time the power is supplied, such that the heater 850 may be heated to a certain temperature or maintained at an appropriate temperature.

In an embodiment, the controller 810 may obtain a sensing signal corresponding to a change in capacitance from the sensing unit 820, and control power supplied to the heater 850 on the basis of the obtained sensing signal. For example, when the obtained sensing signal falls within a preset range in the memory 870, the controller 810 may supply first power to execute a cleaning mode for the heater 850. At this time, the first power may mean an amount of power required to heat the heater 850 to a preset temperature to remove foreign substances attached to the heater 850.

The controller 810 may control the output unit 830 on the basis of a result sensed by the sensing unit 820. For example, when the number of puffs counted through the puff sensor 826 reaches a preset number, the controller 810 may notify the user that the aerosol generating device 800 will soon be terminated through at least one of the display unit 832, the haptic unit 834, and the sound output unit 836.

One embodiment may also be implemented in the form of a computer-readable recording medium including instructions executable by a computer, such as a program module executable by the computer. The computer-readable recording medium may be any available medium that may be accessed by a computer and includes both volatile and nonvolatile media, and removable and non-removable media. In addition, the computer-readable recording medium may include both a computer storage medium and a communication medium. The computer storage medium includes all of volatile and nonvolatile media, and removable and non-removable media implemented by any method or technology for storage of information such as computer-readable instructions, data structures, program modules, or other data. The communication medium typically includes computer-readable instructions, data structures, other data in modulated data signals such as program modules, or other transmission mechanisms, and includes any information transfer media.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An operating method of an aerosol generating device, the operating method comprising:
  - obtaining, from a sensor, a sensing signal corresponding to a change in capacitance of an accommodation space into which an aerosol generating article is inserted;
  - detecting a removal of the aerosol generating article based on the sensing signal obtained from the sensor;
  - based on detecting the removal of the aerosol generating article, detecting whether the sensing signal falls within a preset range;
  - supplying first power to a heater based on the sensing signal being within the preset range;
  - when the sensing signal corresponds to a first capacitance change, supplying the first power to the heater; and,
  - when the sensing signal corresponds to a second capacitance change that is less than the first capacitance change, supplying third power that is greater than the first power to the heater.

2. The operating method of claim 1, further comprising: when the sensing signal exceeds a maximum value of the preset range, blocking power supply to the heater.

3. The operating method of claim 1, further comprising: when the sensing signal is less than a minimum value of the preset range, supplying second power that is less than the first power to the heater.

4. An aerosol generating device comprising:

a heater configured to heat an aerosol generating article;

a sensor configured to generate a sensing signal corresponding to a change in capacitance of an accommodation space into which the aerosol generating article is inserted; and a processor electrically connected to the heater and the sensor, wherein the processor is configured to:

detect a removal of the aerosol generating article based on the sensing signal obtained from the sensor, based on detecting the removal of the aerosol generating article, detect whether the sensing signal obtained from the sensor falls within a preset range, supply first power to the heater based on the sensing signal being within the preset range, when the sensing signal corresponds to a first capacitance change, supply the first power to the heater, and, when the sensing signal corresponds to a second capacitance change that is less than the first capacitance change, supply third power that is greater than the first power to the heater.

5. The aerosol generating device of claim 4, wherein the first power corresponds to an amount of power for heating the heater to a preset temperature such that a foreign substance attached to the heater is separated from the heater.

6. The aerosol generating device of claim 4, wherein the processor is further configured to, when the sensing signal exceeds a maximum value of the preset range, block power supply to the heater.

7. The aerosol generating device of claim 4, wherein the processor is further configured to, when the sensing signal falls within the preset range, output a notification through an output interface.

8. The aerosol generating device of claim 7, wherein the notification comprises at least one of visual information, tactile information, and auditory information.

9. The aerosol generating device of claim 7, wherein the processor is further configured to, when a user input is received in response to the notification, supply the first power to the heater.

10. The aerosol generating device of claim 4, wherein the sensor comprises at least one electrode made of a metal thin film.

11. The aerosol generating device of claim 4, wherein the processor is further configured to, when the sensing signal in the preset range is received, supply the first power to the heater after a preset time.

12. The aerosol generating device of claim 4, wherein the preset range corresponds to an amount of foreign substances in the accommodation space, and wherein the processor is further configured to execute a cleaning mode by supplying the first power to the heater, based on the sensing signal being within the preset range.

* * * * *